(12) United States Patent
Graham

(10) Patent No.: US 8,579,219 B2
(45) Date of Patent: Nov. 12, 2013

(54) MUSICAL CHEESE GRATER

(76) Inventor: Robert J. Graham, Newport, TN (US)

(*) Notice: Subject to any disclaimer, the term of this patent is extended or adjusted under 35 U.S.C. 154(b) by 0 days.

(21) Appl. No.: 13/598,442

(22) Filed: Aug. 29, 2012

(65) Prior Publication Data

US 2013/0105610 A1 May 2, 2013

Related U.S. Application Data

(60) Provisional application No. 61/552,558, filed on Oct. 28, 2011.

(51) Int. Cl.
*B02C 19/00* (2006.01)
*A47J 17/00* (2006.01)

(52) U.S. Cl.
USPC .................................. 241/101.2; 241/273.3

(58) Field of Classification Search
USPC .......................................... 241/101.2, 273.3
See application file for complete search history.

(56) References Cited

U.S. PATENT DOCUMENTS

| 2,604,916 | A * | 7/1952 | Mantelet ..................... 241/273.3 |
| 7,137,581 | B2 * | 11/2006 | Takayama et al. ......... 241/169.1 |
| 7,806,352 | B1 * | 10/2010 | Reimann et al. ................ 241/93 |
| 2006/0196979 | A1 * | 9/2006 | Hanson et al. ................... 241/30 |
| 2008/0017737 | A1 * | 1/2008 | So et al. ........................... 241/93 |
| 2008/0067270 | A1 * | 3/2008 | Strutz ............................... 241/36 |
| 2010/0270406 | A1 * | 10/2010 | Grace et al. ...................... 241/93 |

* cited by examiner

*Primary Examiner* — Faye Francis
(74) *Attorney, Agent, or Firm* — Cherskov Flaynik & Gurda LLC

(57) ABSTRACT

A combination cheese-grater/music-maker device is provided such that grated cheese and musical notes are produced simultaneously and synchronously. The device uses of one or more cylinders rotatably attached to said device wherein all of the cylinders can be rotated simultaneously and synchronously. The device features with a handle to allow a person's hand to impart simultaneous and synchronous rotation to all said cylinders. Musical note producing elements are attached to the device such that a note is produced when a protrusion on a cylinder contacts one such element. The device also features cheese-grating sections on one or more cylinders and with a surface to impart downward pressure on the cheese to facilitate contact of the cheese with the sections.

18 Claims, 11 Drawing Sheets

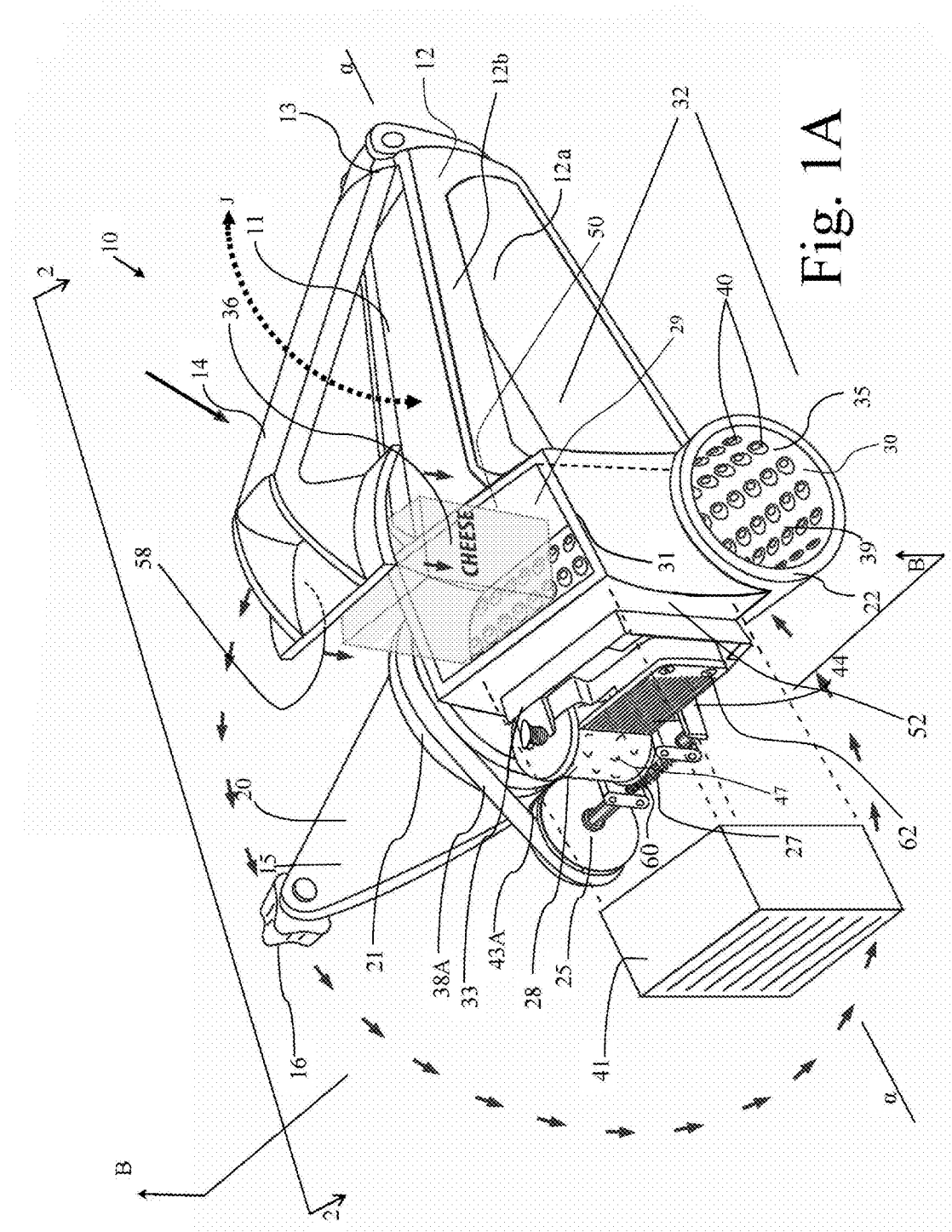

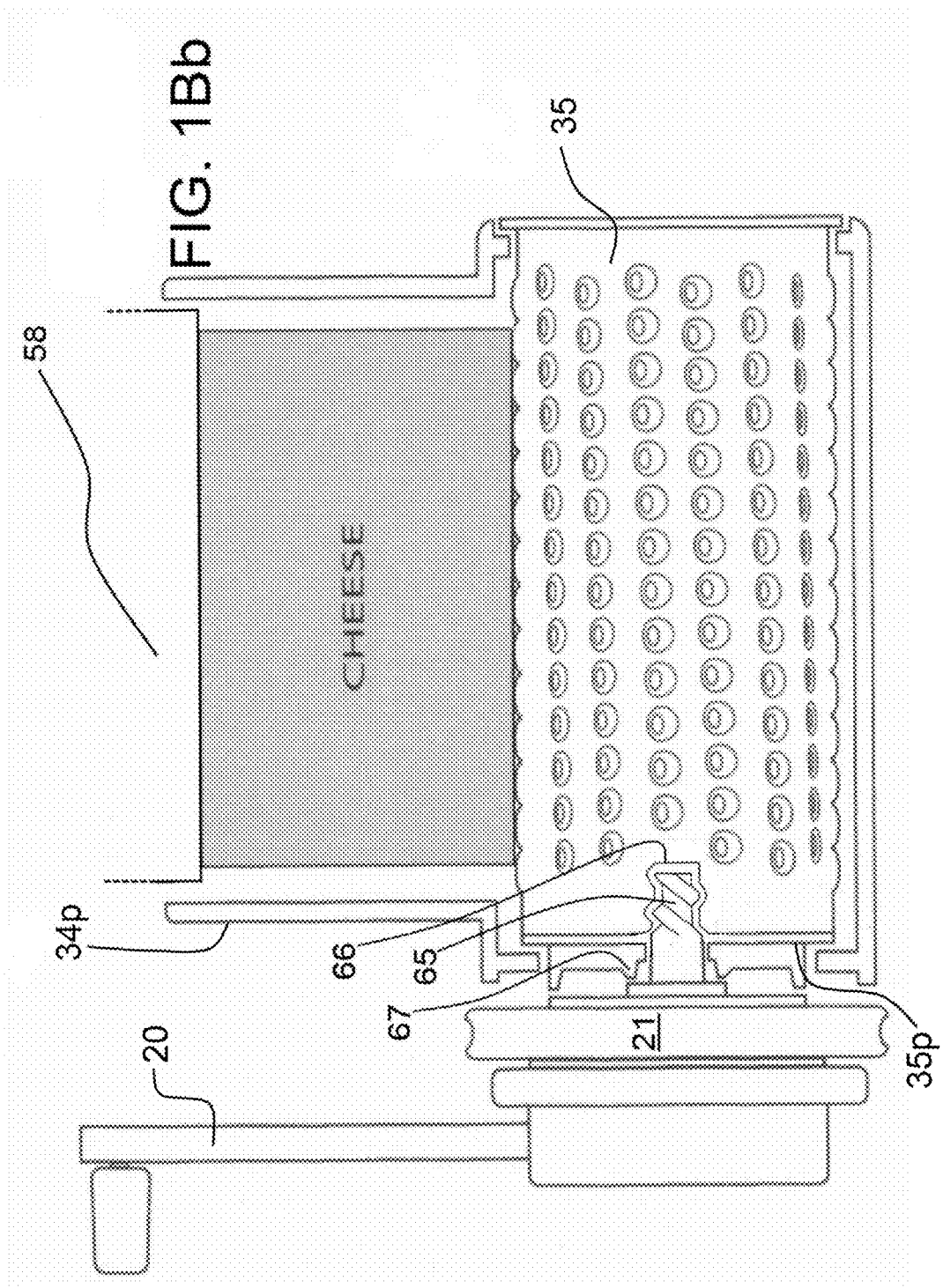

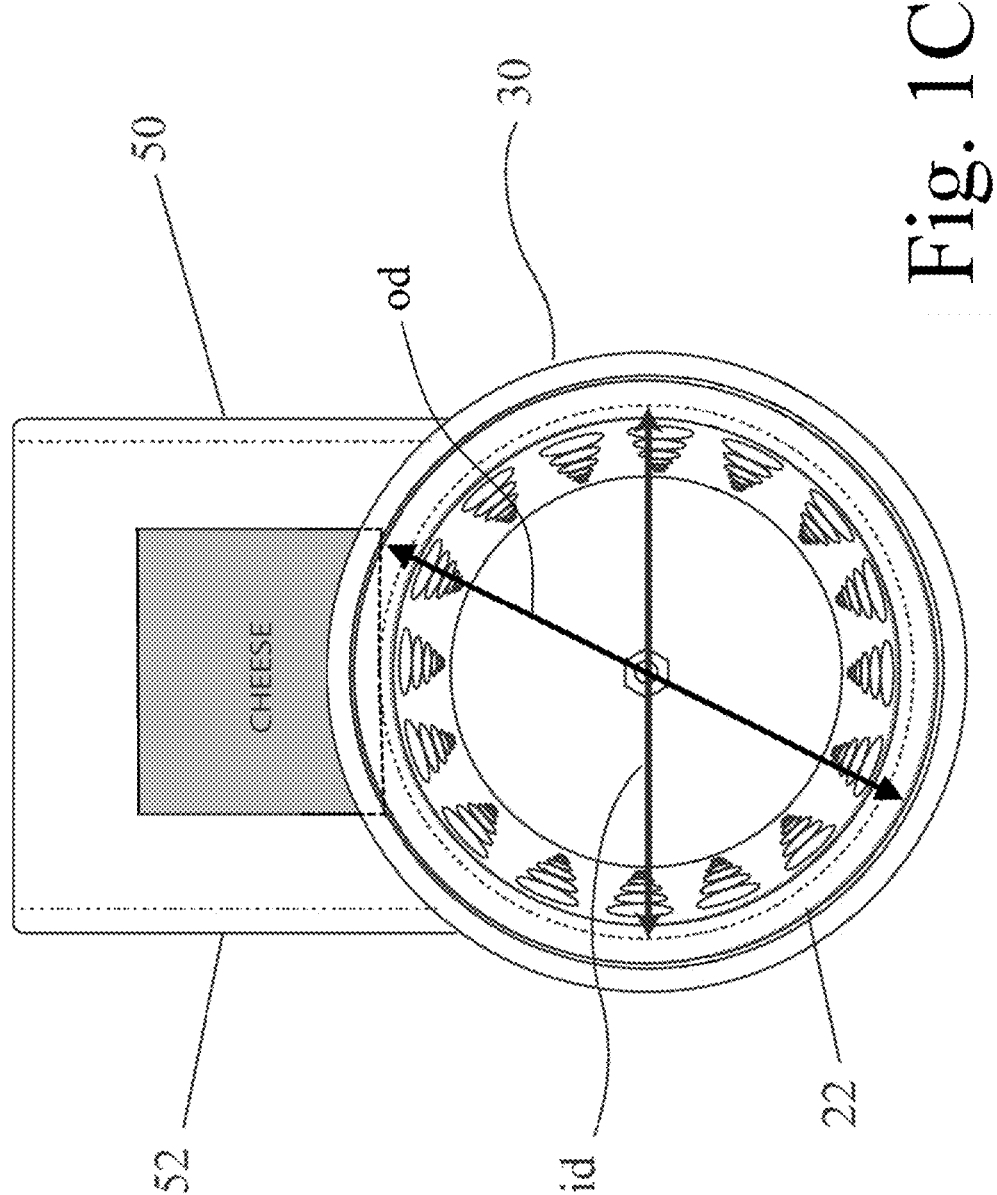

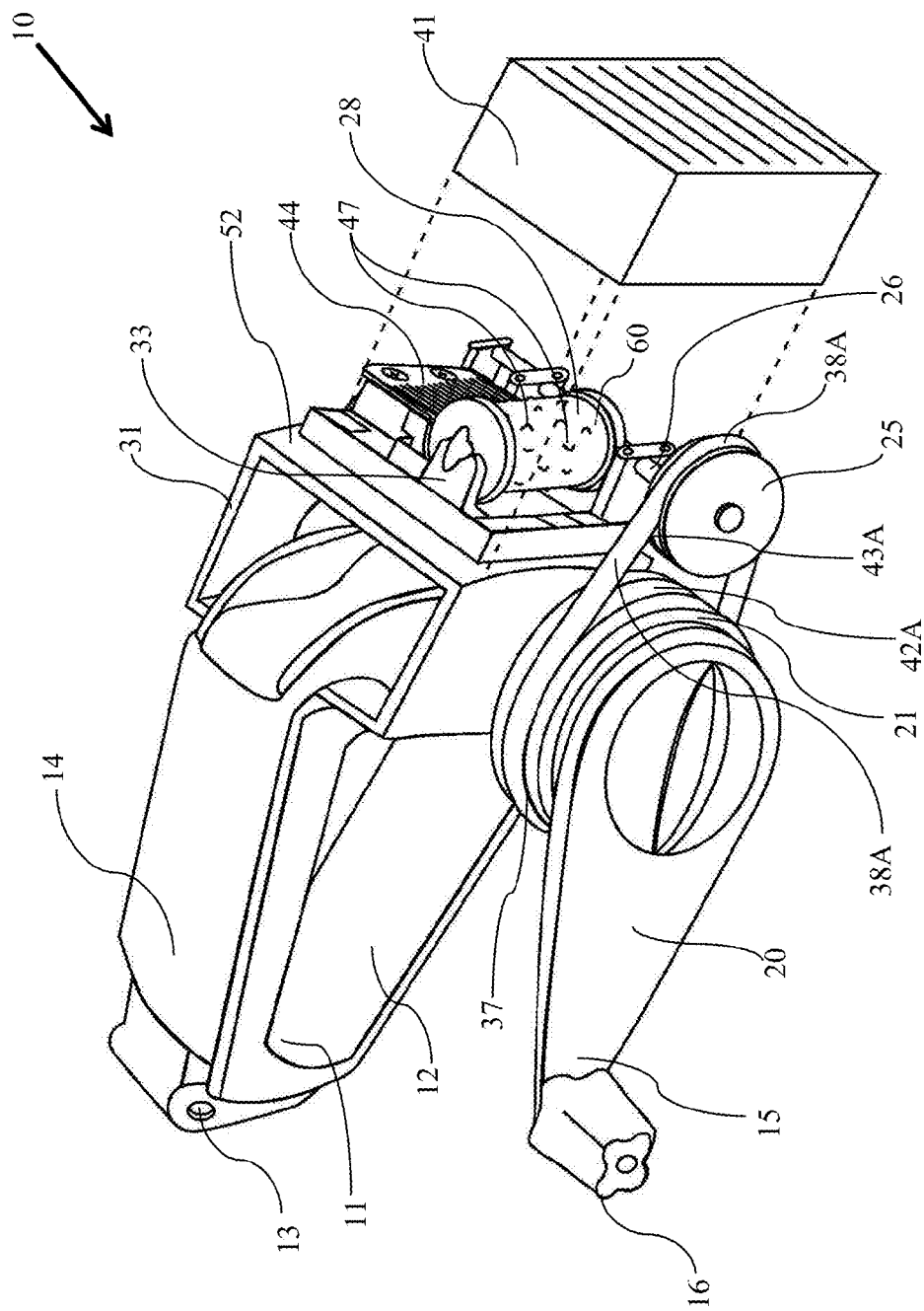

FIG. 4a (detail)
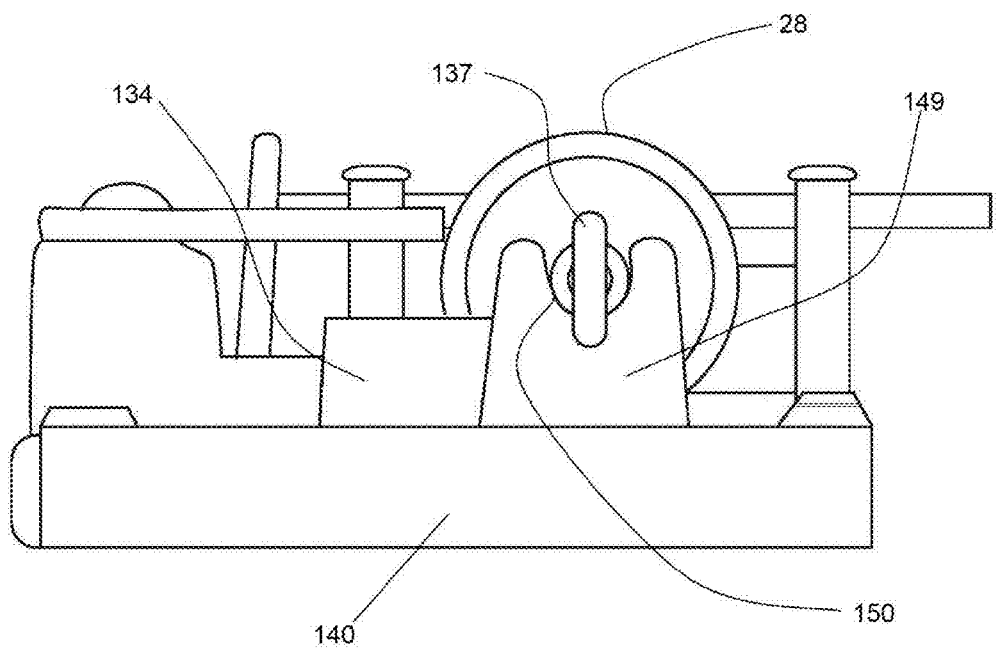
FIG. 4b (detail)
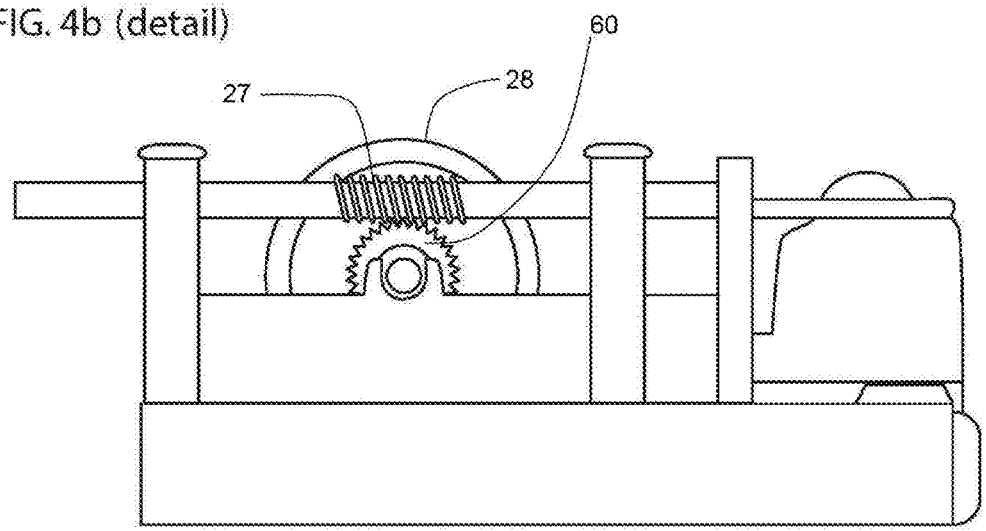

FIG. 4c (detail)
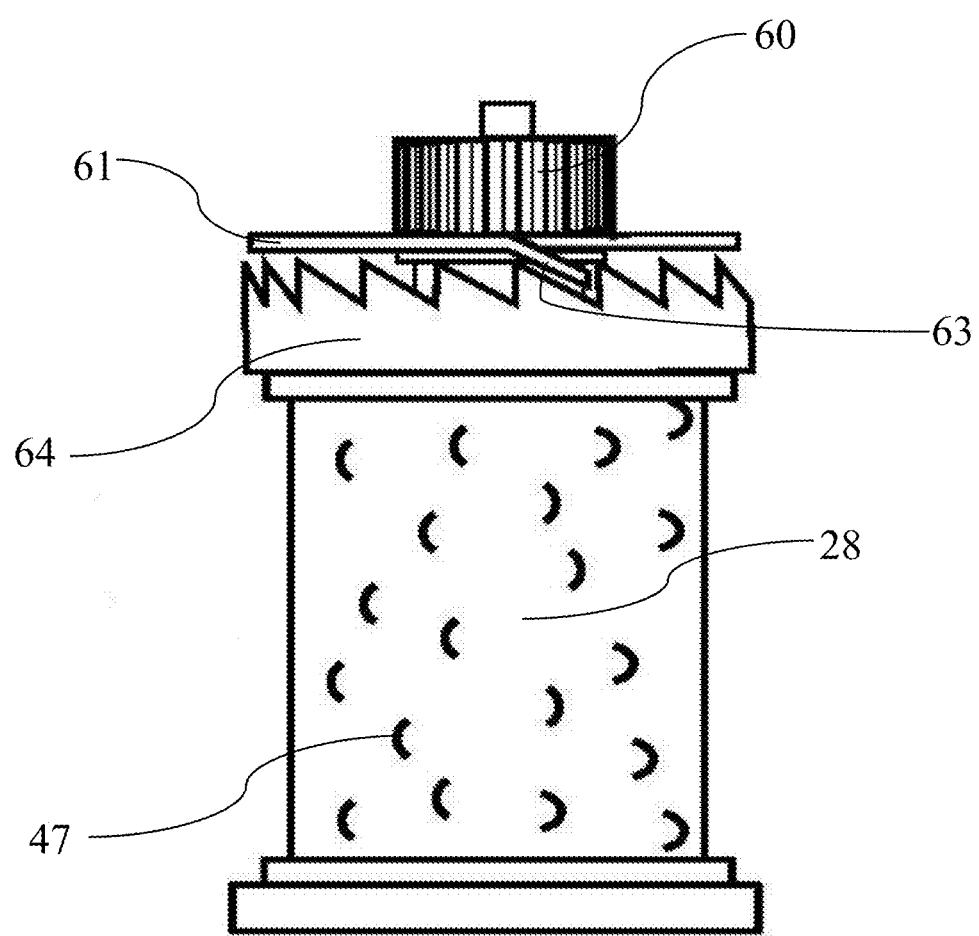

MUSICAL CHEESE GRATER

PRIORITY INFORMATION

This application claims the benefit of U.S. Provisional Application No. 61/552,558 filed on Oct. 28, 2011.

BACKGROUND OF THE INVENTION

1. Field of the Invention

The present invention relates to musical tools, and more specifically, the present invention relates to a rotary device which simultaneously produces music and grates foodstuff such as cheese.

2. Background of the Invention

Manual rotary music makers are ubiquitous in many family celebrations of birthdays, engagements, as well as Christmas, Hanukkah, New Year's Day, and other holidays.

Manual rotary cheese graters are often used to dispense grated cheeses such as Parmesan, Romano, Gruyere, as well as other condiments. This process is often dreary and time-consuming and this puts a damper on the festivities at the dining table.

The state of the art provides no solutions that remedy the dreariness of manual cheese-grating or condiment-grating.

A need exists in the art for a rotary device that simultaneously provides music and grates cheese and thus provides entertainment as cheese is grated at table. In at least one embodiment, the device should be manually actuated so as to aid in portability. Also, the device should look like an ordinary cheese grater so as to provide an element of surprise when the music starts. Finally, the device should be reliable, modular and easy to disassemble for cleaning purposes, and also the device should facilitate a change of the music that it provides.

SUMMARY OF INVENTION

An object of the invention is to alleviate the dreariness of grating cheese (or any other condiment) by providing a rotary device that simultaneously dispenses music and grated cheese.

Another object of the invention is to provide a compact rotary cheese-grating device that produces music. A feature of the invention is that the operation of the cheese grating portion of the device simultaneously produces music. An advantage of the invention is that no separate power source is necessary to produce the music.

Still another object of the invention is to provide a cheese grater that works synergistically with a music maker. A feature of the device is that it is modular. An advantage of the invention is that different sound drums can be utilized by the same composite device, depending on mood, or type of cheese that is grated.

This invention provides a combination device for simultaneous cheese- or food-grating and music-making comprising a housing, a handle attached to the housing and dimensioned so as to be capable to be held in a person's first hand while a second hand of the user activates a rotatable multi-wheel mechanism disposed in the housing; a cheese-grating cylinder driven by said mechanism and a cheese-holding receptacle mounted on the housing; a plurality of protuberances extending from an exterior surface of a second cylinder mounted on the housing; a series of tongs rigidly fixed relative to the second cylinder such that the protuberances actuate the tongs during rotation of the second cylinder to produce sound.

The music mechanism and associated cylinders are available from CoolestToysOnEarth.com and the cheese-grater is available from zylissusa.com.

The present invention presents a combination cheese-grater/music-maker device comprising a plurality of cylinders rotatably attached to said device; and disposed so that all of the cylinders can be rotated simultaneously and synchronously; a single means to impart simultaneous and synchronous rotation to all said cylinders; sound-producing elements attached to the device such that a note is produced when a protrusion on a cylinder contacts one such element; grated-cheese producing sections on one or more cylinders and means to bring cheese into contact with said sections; so that grated cheese and musical notes are produced simultaneously and synchronously.

The present invention can also be described as a manual rotary cheese-grater to which a rotary sound-maker has been attached so that imparting rotation to the cheese-maker so as to produce grated cheese results in imparting simultaneous and synchronous rotation of the sound-maker and production of sound by the sound-maker.

BRIEF DESCRIPTION OF DRAWING

The invention together with the above and other objects and advantages will be best understood from the following detailed description of the preferred embodiment of the invention shown in the accompanying drawings, wherein:

FIG. 1A is a perspective view of an embodiment of the invented musical cheese-grater, in accordance with features of the present invention;

FIG. 1Bb depicts an alternate embodiment of the invented musical cheese-grater depicted in FIG. 1Ba, in accordance with features of the present invention;

FIG. 1C is a view of FIG. 1Ba taken along line C-C.

FIG. 2 depicts a plan view taken along line 2-2 of FIG. 1 of the embodiment of the invented musical cheese-grater depicted in FIG. 1, in accordance with features of the present invention;

FIG. 4a is a detail view of FIG. 4 taken along lines 4a-4a;

FIG. 4b is a detail view of FIG. 4 taken along lines 4b-4b;

FIG. 4c is a detail view of the drum element depicted in FIG. 4;

DETAILED DESCRIPTION OF THE INVENTION

The foregoing summary, as well as the following detailed description of certain embodiments of the present invention, will be better understood when read in conjunction with the appended drawings. As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The present invention provides a combination cheese-grater/music-maker device comprising a plurality of cylinders, all of the cylinders rotatably actuated by a single manually actuated lever. In an embodiment of the invention, all of the cylinders can be rotated simultaneously and synchronously; with a single means to impart simultaneous and synchronous rotation to all said cylinders; with musical notes producing elements attached to the device such that a note is produced when a protrusion on a cylinder contacts one such element; with grated cheese producing sections on one or more cylinders and with means to bring cheese into contact with said sections; so that grated cheese and musical notes are produced simultaneously and synchronously.

The present invention can also be described as a manual rotary cheese-grater to which a rotary music-maker has been attached so that imparting rotation to the cheese-maker so as to produce grated cheese results in imparting simultaneous and synchronous rotation of the music-maker and production of music by the music-maker.

Thus this invention envisions such manual rotary devices as drills, mixers, pepper grinders, blenders, etc. where music is performed or where, say, a dancing puppet or ballerina emerges suddenly as a handle is rotated. There is a myriad of such possible combinations. In all these embodiments, the rate of the repetitive device (for instance, the drill) can be varied as one varies the rate of rotation of the handle but this variation produces a variation of the rate of the amusing device (for instance, the music maker) while the ratio of the two rates remains constant. Thus the two devices are said to be synchronous.

Figure 3:
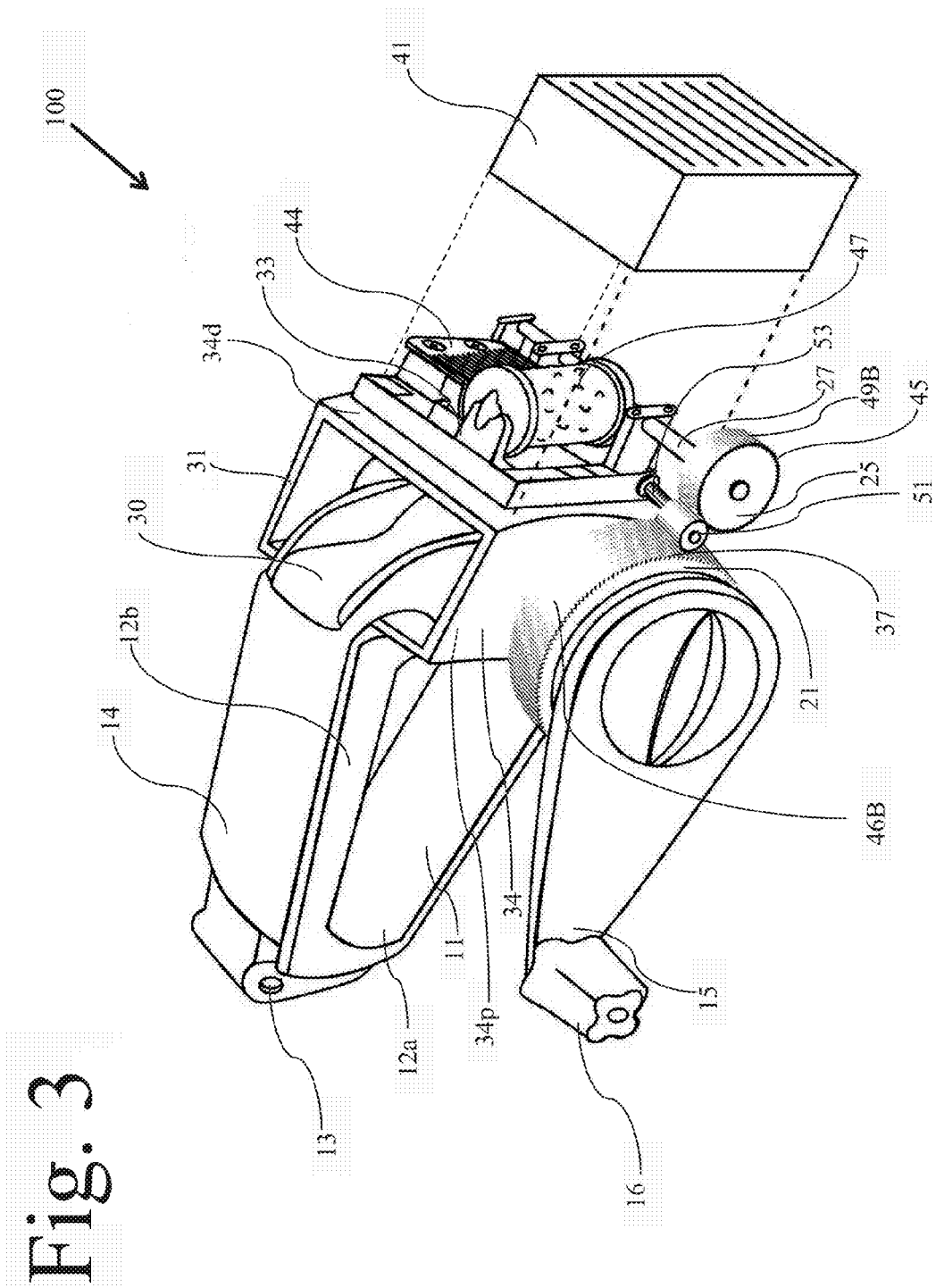
FIG. 3 depicts a perspective view of an alternative embodiment of the invented musical cheese-grater, in accordance with features of the present invention.
Figure 6:
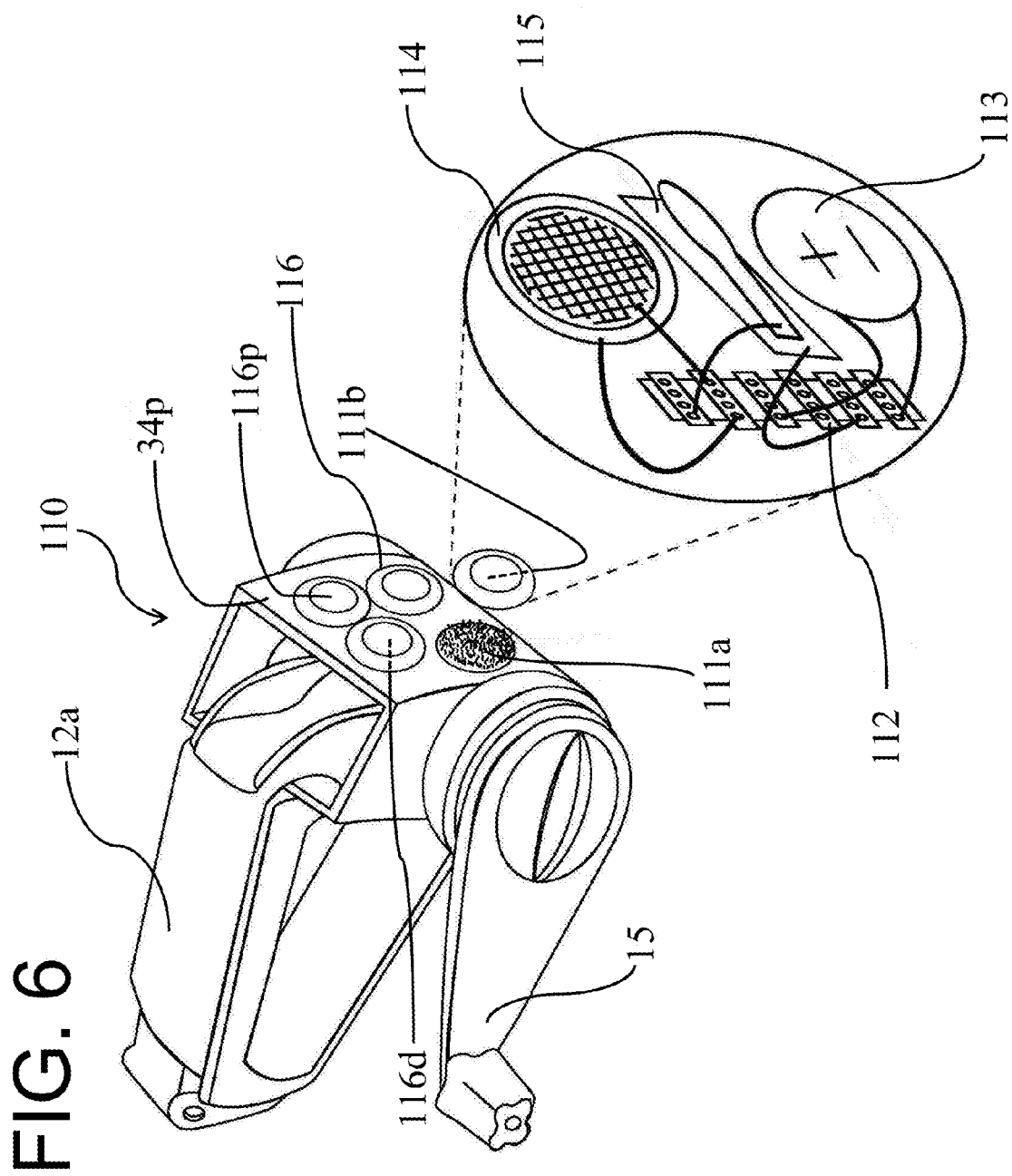
FIG. 6 depicts another alternative embodiment of the invented musical cheese-grater with digital playback.

FIGS. 1A, 3, and 6 depict alternative embodiments of the device, designated as numeral 10, 100, and 110, respectively.

As depicted in FIG. 1A the device comprises a hand-held portion 11, a grater actuating portion 20, and a housing 32 disposed intermediate the hand-held portion and the grater actuating portion. The actuating portion 20 is in rotatable communication with the housing 32 while the hand-held portion 11 is integrally molded to the housing.

Figure 1B:
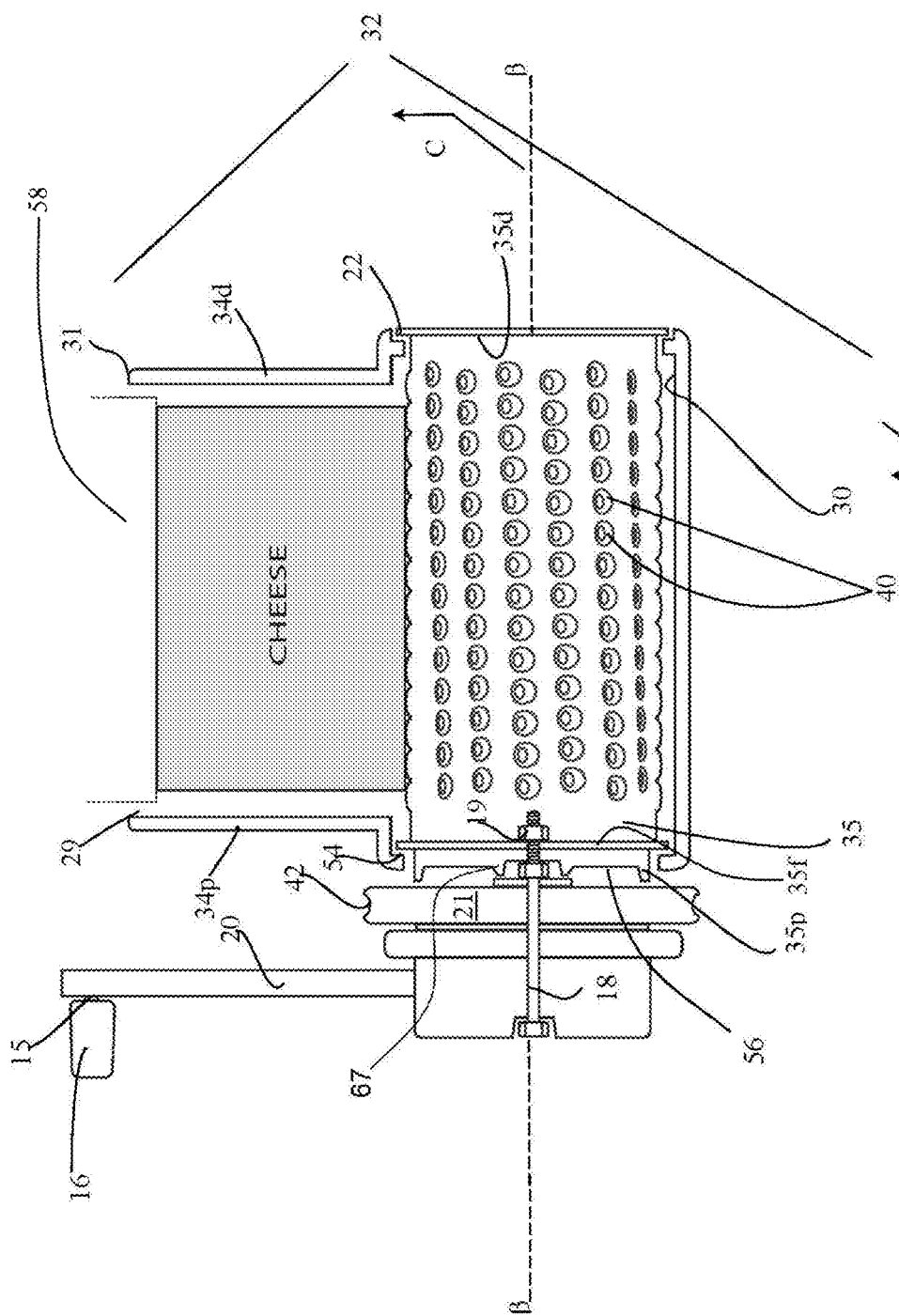
FIG. 1Ba is view of FIG. 1A, taken along line B-B.

In an embodiment of the device, a portion of the housing 32 defines a rectangular cross section opening 29 adapted to receive bulk food (e.g. cheese, meat, vegetable) forms. Ordinarily, the device is held such that the open end of the opening 29 is aligned perpendicular against the force of gravity. As the opening 29 receives bulk food forms, the opening 29 defines a lip 31 to the housing. As shown in FIG. 1Ba, which is a cross section of the housing along line B-B, the housing further defines a proximal lateral facing surface 34$p$ and a distal, lateral facing surface 34$d$. A bottom portion of the housing defines a cylindrical cavity 30 such that the longitudinal axis β of the cylindrical cavity 30 is perpendicular to the grater actuating portion 20. As such, another orthogonal cross section of the housing, from top to bottom, resembles an inverted keyhole, that cross section being shown as FIG. 1C.

The hand-held portion 11 comprises a 2-section V-shaped handle 12, with both sections 12$a$ and 12$b$ rigidly attached to a proximally facing surface 50 of the housing 32. A top portion of the hand-held portion is defined by an arm 14 hingeably-mounted at the apex of the V. The arm has a first proximal end 13 in hingeable communication with a proximal end of the handle. A distal end of the arm 14 freely rotates through an arc along a line parallel to the longitudinal axis a of the device. The arc is depicted in FIG. 1A by a double-headed arrow J.

The distal end of the arm terminates in a downwardly-facing concave surface 58. The periphery of the concave surface has a cross section smaller than the cross section formed by the opening 29 such that the concave surface can descend into the housing 32, toward the grating blades 39 which reside proximal to the bottom of the housing 32. The downwardly-facing concave surface 58 is adapted to contact a bulk food item 36 such as cheese, vegetable, meat or the like, so as to facilitate downward progression of the food item toward a plurality of grating blades 39 when the bulk item is placed inside the housing. The curved surface 58 is urged downward toward the grating blades 39 when the user grasps the static portion 12 of the handle and the hingeably mounted substrate 14 with the same hand, and squeezes the arm toward the static portion.

A mounting plate or bracket 33 is attached to the housing 32 on a distal facing side 52 of the housing. In an embodiment, the bracket is reversibly mounted to the distal facing side 52, such mounting facilitated by screws 62. Other mounting means are also suitable, including bolt and nut configurations, tongue and groove configurations, snap fit configurations and combinations thereof.

Cheese Grater

Unit Detail

The cheese grater portion of the device comprises a cylindrical cutting surface 35 having its longitudinal axis arranged substantially perpendicular to the longitudinal axis a of the device, and coaxial to the longitudinal axis β of the cylindrical cavity 30 (See FIGS. 1Ba and 1Bb). The cylindrical cutting surface 35 is in rotatable communication with the cylindrical cavity 30. The radius of the cylindrical cavity is slightly larger than the radius of curvature of the cylindrical cutting surface 35, thereby facilitating nesting of the cylindrical cutting surface at least partially within the cavity. A lip 35$d$ at the distal end of the cylindrical cutting surface 35 defines a round periphery that is in a rotatable contact with a flange 22. The flange 22 extends a distance over the inner diameter "id" of the cylindrical cavity, as depicted in FIG. 1C, but not over the outer diameter "od" of the cylindrical cavity. (Similarly the ring surface 35$f$ on the opposite end of the cutting surface 35 is in rotatable contact with the lip 54 on the housing). The flange 22 and the lip 54 maintain the cylindrical cutting surface 35 flush with the sides of the cylindrical cavity 30. As depicted in FIG. 1Ba, the center of a first (proximal) end 35$p$ of the cylinder is rigidly attached to a rod 18 (such as a bolt). In this instance, the proximal end of the cylinder terminates in solid transversely extending surface 56 such that the cylinder defining the cylindrical cutting surface is capped at that end. Means for attaching the rod to the solid end of the cylinder can vary, and include a configuration where the end of the rod defines a threaded male protuberance adapted to receive a nut 19. In this instance, the solid end of the cylinder defines a transverse aperture coaxial to the rod and the nut and wherein the transverse aperture is positioned between the end of the rod and the bolt. In an embodiment of the invention, a bolt is affixed to the handle 15, the bolt 18 mating with a nut first affixed to the closed end 56 of the cylindrical grating surface. However, in other embodiments, the rod 18 may be welded, glued, clamped or otherwise affixed to a laterally facing surface of the handle 15.

FIG. 1Bb depicts an alternate method of attaching the cylinder to the handle. As shown in FIG. 1Bb, a bolt 65 is molded or welded onto the handle and this bolt is received by a female-threaded cavity 66 formed into the cheese cylinder 35.

Axially extending protuberances 67 integrally molded to the solid cap 56 provide a means for spacing the proximal end 35p of the cylindrical cutting surface from a medially-facing surface of the first wheel 21.

The first laterally facing side wall 34p is in close spatial relationship to the first wheel 21, that side wall 34p proximally situated relative to the grater actuating arm 20.

The cylinder 35 is mounted to a depending end of the housing 32 so as to allow its relative rotation therewith. Protuberances 40 breaching the outside surface of the cylinder 35 define the aforementioned grating blades 39. The protuberances are hollow, thereby serving as conduits adapted to receive grated food. Therefore, the conduits facilitate egress of grated material from the interior of the housing 32 and ingress to the interior of the cylinder 35.

The actuating portion 20 of the device is depicted in FIG. 2 which is a view taken from FIG. 1A along lines 2-2.

A first end (or proximal end) of a rotating arm 15 is rigidly attached to a first wheel 21, the center of which is affixed to a rod 18 that extends in a direction that is generally perpendicular to the longitudinal axis a of the device. In an embodiment of the device, the rod is co-axial to the center of the first wheel 21. A knob 16 is rotatably attached to a second end (or distal end) of the arm 15.

The proximal region of the rod 18 is rotatably supported by a side-wall (i.e., a laterally facing wall) 34p of the housing which is in close spatial relationship to the first wheel 21 and rigidly attached to the center of the cheese-grating cylinder 35 (shown in FIG. 1Ba). The arm 15 can be rotated by grasping and pushing up or down on the knob 16 by whatever hand is not used in grasping the handle 12. Rotation of the arm 15 results in rotation of the first wheel 21 and of the rod 18.

Rotation of the rod 18 results in rotation of the cheese-grating cylinder 35.

If a piece of cheese 36, vegetable or meat is placed in the opening 29 and pressed upon by the presser 58, a surface of the food contacts the grating cylinder 35 so that grated cheese is sheared or otherwise removed from the bulk food from 36 to fall to the bottom of the housing via the conduits formed by the protuberances 40.

The grated cheese may be dispensed from the device by removing it from within the interior of the cylinder 35, primarily relying on gravity. The device may also be turned upside down to facilitate grated food removal from within the housing 32, thereby also allowing gravity to facilitate removal.

Sound-Making

Portion Detail

A salient feature of the device is the utilization of the cheese grating action to produce sound. In an embodiment of the invention, a sound making portion of the device is located at a distal end of the device and rigidly attached thereto. This helps direct the sound away from a server and toward a customer or diner when the grater is used by the server.

To facilitate placement of the sound-making portion of the device, the bracket or mounting plate 33 is positioned at the distal facing surface of the housing, as noted supra. To this plate are mounted various elements of the sound-making portion. In an embodiment of the invention, the entire sound-making portion is reversibly mounted to the mounting plate so as to afford easy cleaning, replacement or swapping of one sound generator for another. This reversibly mounted feature is facilitated via mounting screws, snap fit configurations, tongue and groove configurations, or other means. Also, the music-making portion comprises a drum that can be detached from the sound unit, and replaced with another drum.

The present invention utilizes a comb-like array 44 of rigid-fingers, such that the tips of the fingers define a line that is parallel to the longitudinal axis of a drum 28. Each of the tips of the fingers opposes the surface of the drum 28 such that a space exists between the drum surface and the tips. However, protuberances, or teeth, 47 from the drum surface, placed at predefined regions on the surface, contact the tips while the drum 28 rotates. A sound of a particular audio signature (such as a musical note) is produced when one of said protuberances actuates one of the fingers during drum rotation. The speed at which the notes are produced depends on the rate of rotation of the drum. However, the pitch of the notes is not affected by drum rotation speed.

In the embodiment depicted in FIG. 2, a wheel 21, positioned between the arm 15 and the housing 32, is rigidly fixed to the rod 18 that transmits rotation to the cheese grating cylinder. The rim 37 of the wheel 21 comprises a groove 42A adapted to frictionally engage an elastic circular belt 38A such as a rubber O-ring.

Figure 4:
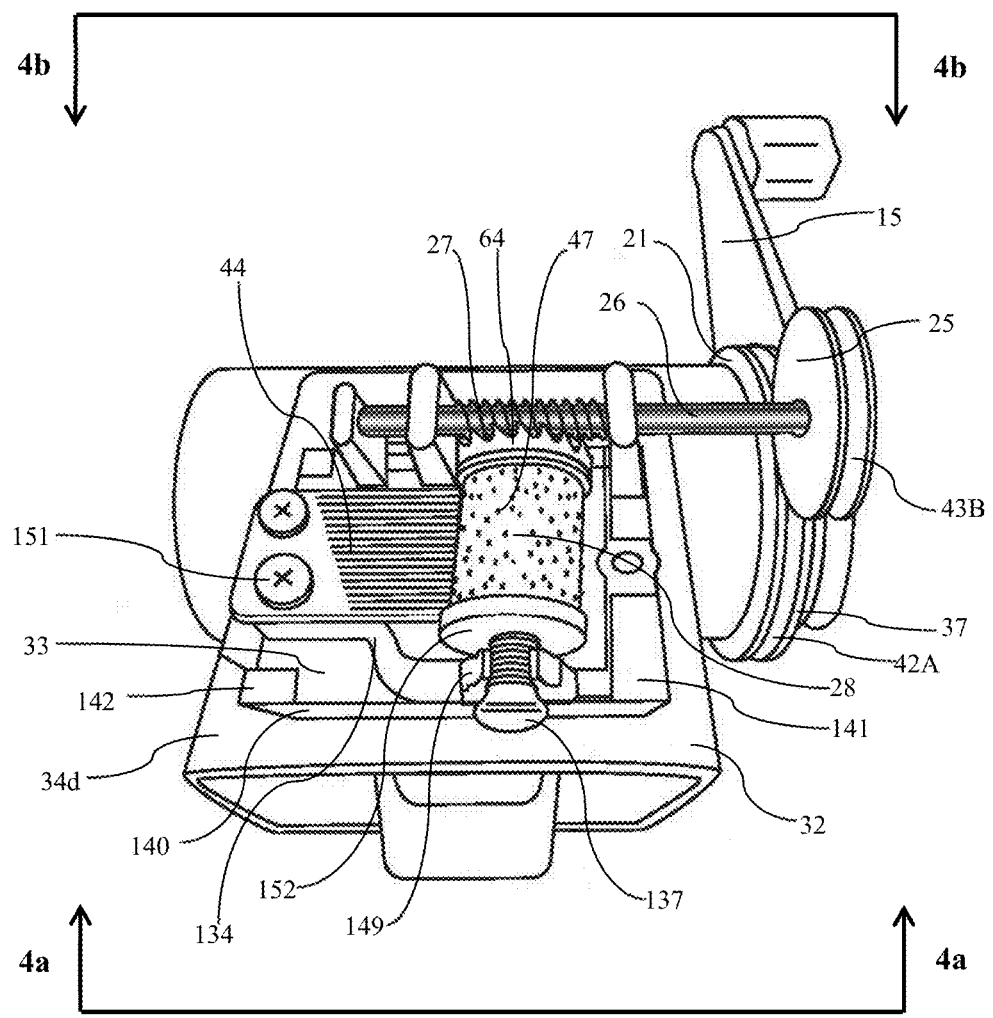
FIG. 4 depicts a perspective view of a music element of an alternative embodiment of the invented musical cheese-grater, in accordance with features of the present invention.
Figure 5A:
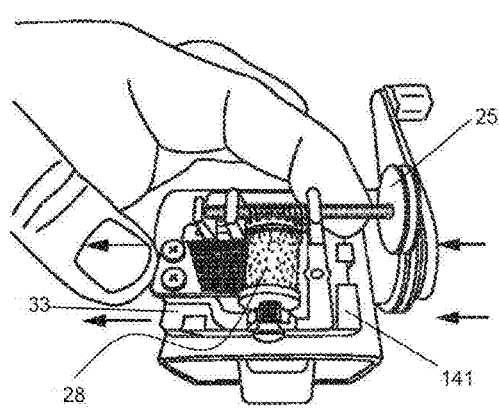
FIGS. 5a-5f depict the steps used in replacing a music cylinder in the alternative embodiment of the invented musical cheese-grater depicted in FIG. 4.
Figure 5D:
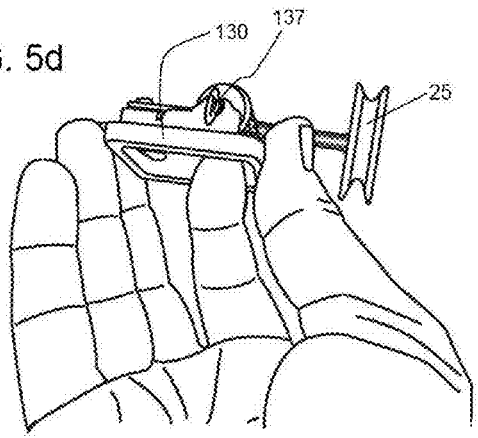
Figure 5B:
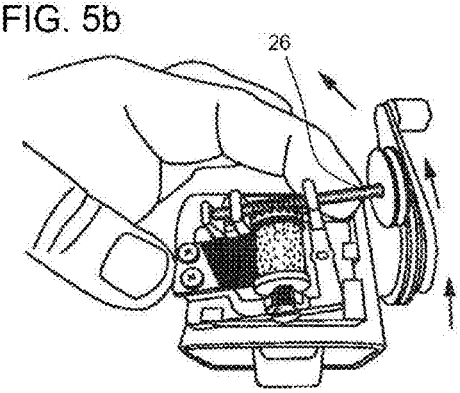
Figure 5E:
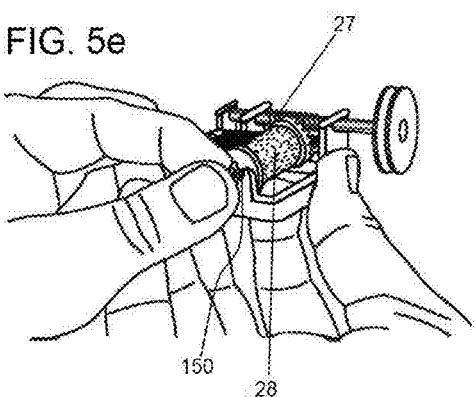
Figure 5C:
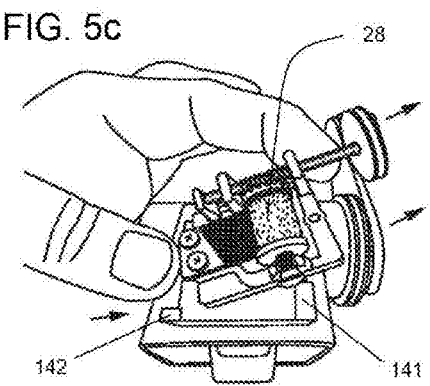
Figure 5F:
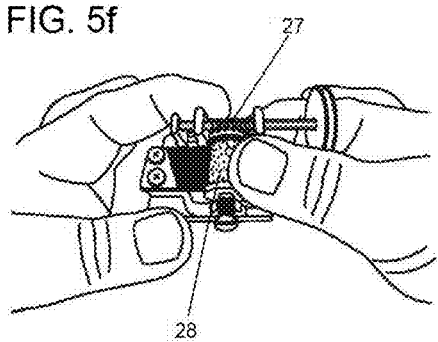

The belt 38A is also wound tightly around a groove 43A in a second wheel 25, which is rotatably mounted to the aforementioned mounting plate 33 via the second wheel's axle 26. As shown in FIG. 4, a first or distal end of the axle 26 is rigidly attached to the second wheel 25 while a proximal region of the axle defines a horizontally disposed (i.e., transversely extending) worm gear 27. Flanking this worm gear are smooth portions of the axle which rotatably communicate with the mounting plate 33 of the musical mechanism. Rotation of the first wheel 21 results in rotation of the second wheel 25.

As shown in FIG. 4b, the worm gear 27 is in mating relationship with a spur gear 60. As shown in FIG. 4c, the spur gear 60 is mounted on a slip disc 61, which has at least one prong 63 dipping at an angle below the major plane of the slip disc. As can be seen in FIG. 4c, this prong 63 is angled in such a way as to engage the teeth of bevel gear 64 when the handle is cranked in the direction defined in FIG. 1. The bevel gear 64 has teeth that circumferentially extend about the periphery of the depending end of the drum 28. Rotation of the worm gear results in rotation of the drum 28, and therefore actuation of the aforementioned comb-shaped array 44 of the fingers as discussed supra. Should the handle be cranked in the direction opposite to that defined in FIG. 1, the prongs 63 will slide over the teeth of the bevel gear 64 instead of engaging the teeth and driving the drum 28. This safeguard prevents the drum 28 from rotating in the wrong direction, which could cause the finger-like, comb-shaped array 44 to shear off the protuberances 47 on the drum 28.

A comb-shaped array 44 of elements capable of producing musical notes is affixed on the bracket 33 such that a note is produced whenever a protuberance 47 on the cylinder 28 contacts an element of the array.

A snap-on louvered structure 41 covers the volume surrounding the cylinder 28.

The present invented arrangement results in the simultaneous and synchronous production of grated cheese and of music at a speed dependent only on the rate at which the arm is rotated. The present invention thus provides entertainment and grated cheese at the same time.

Mounting Detail

The musical mechanism ("MM") is slidably received into a bracket mounted to the distal face of the cheese grater, which allows for rapid replacement of the musical drum. However, other embodiments utilizing a fixed mounting are operable and easily envisioned. Such mountings could be accomplished through a variety of securing means such as screws, glues or epoxies, heat fusion of plastic elements, etc. The present invention utilizes a removable musical mechanism to allow the user to change the drum melody and to clean or replace components.

As can be seen in FIG. 4, a bracket 140 is affixed to the lateral distant surface 34*d* of the grater housing. This bracket has tabs 141, 142 that form a pocket into which the mounting plate 33 of the MM is slidably received. The mounting plate 33 has a ridge 134 onto which the comb-shaped array 44 is held down by screws 151. Along the axis of the cylinder 28 there is at the top end 152 of the cylinder 28 an axial cavity which rotatably receives an end portion of the thumb-screw 137.

The ridge 134 comprises a projection 149 that defines a U-shaped female threaded enclosure 150 with the thread along the inner sides of the U. (See Detail 4*a*.) The thumbscrew 137 is threadably received in the female-threaded enclosure 150. This not only allows one to advance or retract the screw perpendicularly to the plane of the U but also to remove the screw from the enclosure 150 by applying a force to the head of the screw perpendicularly to the cylinder 28.

Removal and replacement of a music cylinder can be effected by the following steps (See FIGS. 5*a*-5*f*):

1) Gently lift and stretch the elastic belt 38A off the wheel 25.
2) Slide the plate 33 roughly ¼ in away from the wheel 25 until the MM clears the tab 141 (see FIG. 5*a*).
3) Using the left index finger lifting axle 26, raise the right end of the MM until it clears top edge of the bracket tab 141 (see FIG. 5*b*).
4) Slide the MM ¼ in. in the direction of the wheel 25 until the plate 33 clears the tab 142. (see FIG. 5*c*). The MM is now clear of the grater.
5) Hold the MM with right hand index finger supporting cylinder 28 (see FIG. 5*d*).
6) With left hand turn thumbscrew 137 approximately 12 half turns counter-clockwise until the screw is clear of the cylinder 28 but still held in the enclosure 150 (see FIG. 5*e*).
7) Holding the MM with the left hand and with right hand index finger still supporting cylinder 28, pull the cylinder axle back off the axle seat until the gear clears the worm gear 27 and the axle clears the front of the MM housing. Then slide the cylinder through bottom of the MM housing. (see FIG. 5*f*).

A cylinder can be reinstalled by reversing the above process.

Just as in FIG. 2, a snap-on louvered structure covers the volume surrounding the cylinder 28.

The presently invented arrangement results in the simultaneous and synchronous production of grated cheese and of music at a speed dependent only on the rate at which the arm is rotated.

Other embodiments are easily envisioned. For instance, one can arrange to have but one rotating cylinder, with a section thereof bearing cheese-grating elements, another section reserved for music making, and a wall therebetween.

An Alternative Embodiment

FIG. 3 depicts an alternative embodiment 100 of the rotating portion 20. In this embodiment the rim 37 of the first wheel 21 supports a circular gear 46B. Similarly the rim of the second wheel 25 supports a circular gear 49B. A gear wheel 51 affixed to the receptacle 53 transmits rotation of the wheel 21 to the second wheel 49B. In all other respects, the two embodiments are substantially the same.

Digital Alternative Embodiment

Another alternative embodiment features a digital music player. The digital musical cheese grater invention 110 is depicted in FIG. 6. Instead of a mechanical connection between the rotating arm 15 and the musical mechanism ("MM"), the music playback feature is activated via finger pressure while holding the grater. The user grips the top portion of the handle 12*a* with the thumb, ring, and pinkie fingers of the first hand. The index and middle fingers then reach over to the proximal, lateral facing surface of the housing 34*p* where the digital music player 116 is located. The user then rotates the arm 15 with the second free hand. Thus, synchronous musical playback and cheese grating occurs. A more detailed description of how the digital playback feature is achieved is provided below.

The digital music player 116 is mounted to the proximal, lateral facing surface of the housing 34*p*. The mounting can be accomplished in a variety of ways including glues, epoxies, double-sided tapes, etc. The depiction in FIG. 6 shows a hook and loop fastener used in the mounting, which allows for easy exchange of digital music players when the user desires new music or when the digital player's battery dies. A first, loop-containing patch 111*a* is attached to the proximal, lateral facing surface of the housing 34*p*, and a second, hook-containing patch 111*b* is attached to the distal side of the digital music player 116. The user may attach as many digital players as is allowed by the area on the cheese grating device. Other locations are easily envisioned. For instance, digital players can also be mounted to the handle or to the sidewalls of the housing.

The digital music player 116 utilizes a simple circuit design in order to realize music playback. The digital music player 116 consists of a battery 113 that powers the music playback circuitry, a leaf switch 115 that triggers the music when the user's finger presses on the proximal face of the digital player 116*p*, a processor chip 112 that stores the music. Finally, a speaker 114 produces an audible sound. Such digital music players are inexpensive and come with a variety of pre-loaded or customizable melodies. An advantage of this embodiment is that it is not limited to purely musical playback. The digital players can also produce vocal recordings. In the embodiment shown in FIG. 6, different music is triggered by different buttons.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The invention claimed is:

1. A combination cheese-grater/music-maker device such that grated cheese and musical notes are produced simultaneously and synchronously, said device comprising:
    a) one or more cylinders rotatably attached to said device;
    b) said one or more cylinders disposed so that said one or more cylinders can be rotated simultaneously and synchronously;
    c) a means to allow a person's hand to impart simultaneous and synchronous rotation to all said cylinders;
    d) musical notes producing elements attached to the device such that a note is produced when a protrusion on one of said one or more cylinders contacts one such element; and
    e) cheese-grating sections on one or more cylinders and means to bring cheese into contact with said sections.

2. The device as recited in claim 1 wherein two or more said cylinders are parallel to each other.

3. The device as recited in claim 1 wherein two said cylinders are perpendicular to each other.

4. The device as recited in claim 1 wherein two or more said cylinders rotate at different rates.

5. The device as recited in claim 1 wherein one or more said cylinders are metallic.

6. The device as recited in claim 1 wherein one or more said cylinders are ceramic.

7. The device as recited in claim 1 wherein one or more said cylinders are plastic.

8. A device that simultaneously provides cheese-grating and music, said device comprising:
    a) a manual rotary cheese-grater comprising a housing and a first cylinder having an external surface defining grating blades, the first cylinder in rotatable communication with the housing;
    b) a music-maker rigidly attached to the cheese-grater, the music maker comprising a drum cylinder in close spatial relation to a row of teeth placed on a comb; and
    c) a means for simultaneously rotating the cylinder and the drum.

9. The device as recited in claim 8 wherein the music maker is removably attached to the cheese grater.

10. The device as recited in claim 8 wherein the comb is removably attached to the housing.

11. The device as recited in claim 8 wherein the cylinder and the drum rotate at different rates.

12. A device that alleviates the dreariness of cheese-grating by producing music while cheese is being grated, said device comprising:
    a) a manual rotary cheese-grater comprising
        a cheese receptacle,
        a first rotary axis affixed to a grating cylinder and rotatably attached to said receptacle,
        and an arm affixed to said axis;
    b) a manual rotary music-maker comprising
        a serrated cylinder with a second axis rotatably attached to said receptacle,
        an array of musical notes making elements juxtaposed to said serrated cylinder,
    c) means linking said cylinders and constraining the second cylinder to rotate when the first cylinder rotates so that grated cheese and music are produced simultaneously and synchronously when the arm is rotated.

13. The device as recited in claim 12 wherein two or more said cylinders are parallel to each other.

14. The device as recited in claim 12 wherein two said cylinders are perpendicular to each other.

15. The device as recited in claim 12 wherein two or more said cylinders rotate at different rates.

16. The device as recited in claim 12 wherein one or more said cylinders are metallic.

17. The device as recited in claim 12 wherein one or more said cylinders are ceramic.

18. The device as recited in claim 12 wherein one or more said cylinders are plastic.

* * * * *